Dec. 6, 1938.   H. F. RUGGLES   2,138,942
AUTOMATIC NUT CRACKING MACHINE
Filed May 2, 1935   4 Sheets-Sheet 1

Inventor
Henry F. Ruggles
By Arthur J. Robert
Attorney

Dec. 6, 1938.                H. F. RUGGLES                2,138,942
                       AUTOMATIC NUT CRACKING MACHINE
                          Filed May 2, 1935         4 Sheets-Sheet 2
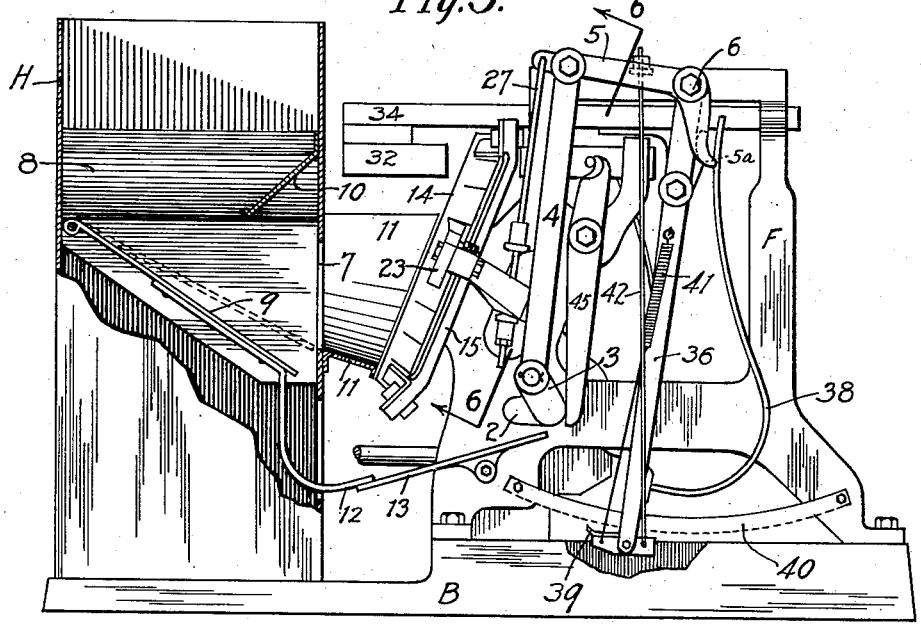
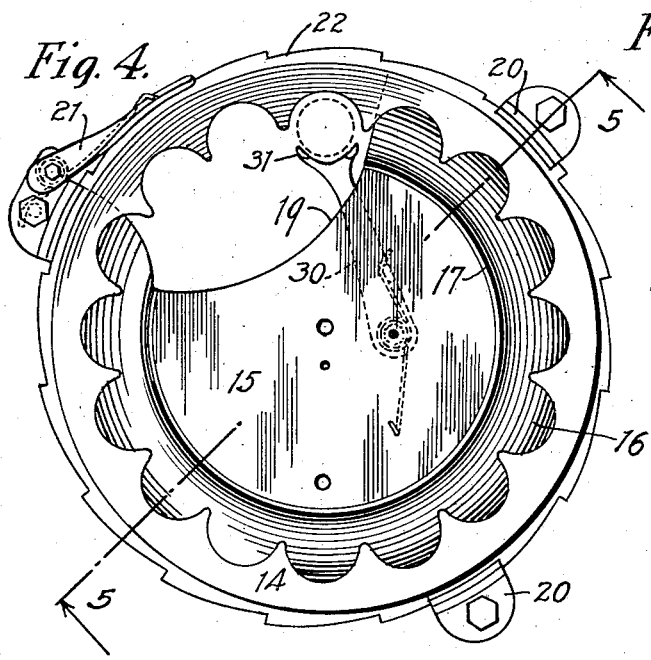
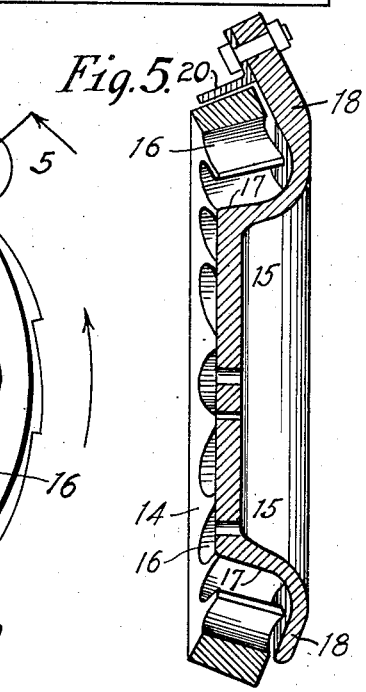
Inventor
Henry F. Ruggles
By Arthur J. Robert
       Attorney Dec. 6, 1938.  H. F. RUGGLES  2,138,942
AUTOMATIC NUT CRACKING MACHINE
Filed May 2, 1935  4 Sheets-Sheet 3

Inventor
Henry F. Ruggles
By Arthur F. Robert
Attorney

Dec. 6, 1938. H. F. RUGGLES 2,138,942
AUTOMATIC NUT CRACKING MACHINE
Filed May 2, 1935 4 Sheets-Sheet 4

Inventor
Henry F. Ruggles
By Arthur J. Robert
Attorney

Patented Dec. 6, 1938

2,138,942

UNITED STATES PATENT OFFICE 2,138,942

AUTOMATIC NUT CRACKING MACHINE

Henry F. Ruggles, Louisville, Ky.

Application May 2, 1935, Serial No. 19,362

6 Claims. (Cl. 146—12)

This invention relates to new and useful improvements in automatic nut cracking machines of the character wherein nuts are fed from a hopper to the nut receiving recesses of a conveyor in which they are carried to the nut cracking area and there successively clamped, cracked and removed.

One object of the invention is to provide means for feeding nuts from the hopper which not only operates to prevent the jamming of nuts in the hopper, but also to feed the nuts slowly to the conveyor and thereby prevent their becoming jammed along its nut receiving recesses.

Another object is to provide an improved form of conveyor which prevents the entry of more than one nut of ordinary size into any one of its nut receiving recesses.

Another object is to provide an improved form of conveyor which operates by rolling the nuts to insure their delivery to a nut holder in the proper nut cracking position.

Another object is to provide an improved form of holder which maintains the nut in the delivered position and prevents it from rocking or otherwise turning out of such position.

A further object is to provide a novel and simple form of means for clamping and cracking nuts of different size.

A further object is to provide a device of this character which is effective in operation and relatively inexpensive to construct.

The invention is illustrated in the accompanying drawings, wherein:—

Figure 11:
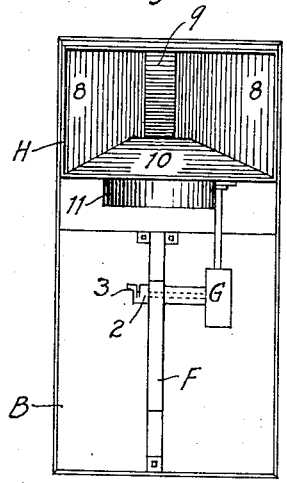
Figure 11 is a schematic top plan view of the machine showing the general arrangement of the base, hopper, motor, gear reducer, and upright frame.

Figure 3 is a side elevation of the other side of the machine with the parts in the same relative position which they occupy in Figure 1;

Figure 4 is a front elevation of the conveyor mechanism;

Figure 5 is a section along line 5—5 of Figure 4;

Schematic layout—Figure 11

The structure illustrated in the drawings includes a base B to which a hopper H, motor M, gear reducer G and upright frame F are secured and by which they are supported. The hopper is placed across the rear end of the base while the motor is arranged underneath the hopper adjacent a rear corner of the base. The upright frame F is composed of front and rear vertical members connected by top and bottom horizontal members all of which form a rectangular skeleton frame which is secured to the base B by suitable legs at its front and rear lower corners. This frame extends centrally from the front end of the base toward the hopper. The gear reducer is arranged at one side of the rear end of the upright frame F and directly in front of the motor.

Figure 1:
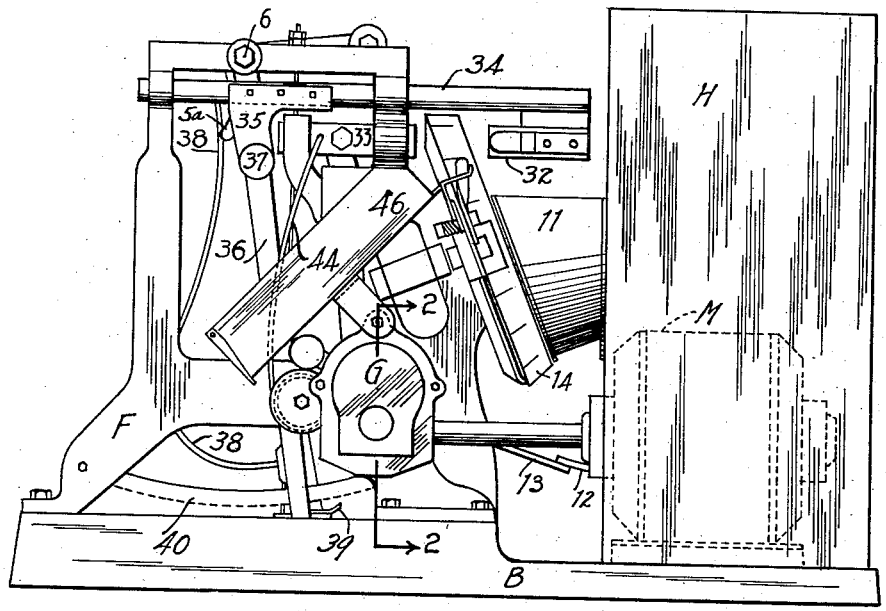
Figure 1 is a side elevation of a machine constructed in accordance with my invention, the parts being in a position corresponding to L—5 of Figure 12.
Figure 2:
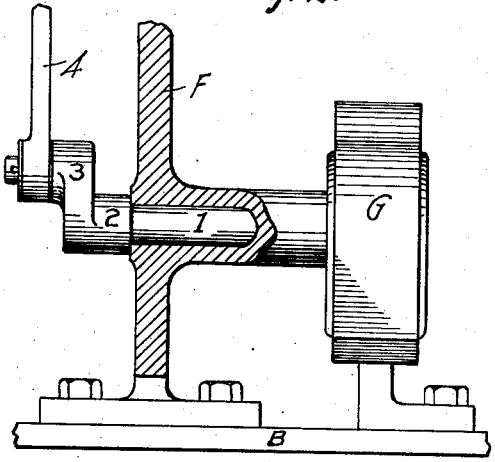
Figure 2 is a view partly in section and partly in elevation taken along lines 2—2 of Figure 1.

Main drive—Figures 1-3

The shaft of the motor M is suitably connected to the gear reducer G and, through it, to one end of a drive shaft 1 (Figure 2). The drive shaft extends from the gear reducer transversely through the lower rear corner of the frame F and carries, on the other side of the frame, a cam 2 and a crank 3, the cam being located between the crank and the frame. The crank 3 is connected through a vertical link 4 to the horizontal arm of a bell crank lever 5 which is pivotally mounted on a pin 6, the pin being fixed to the frame F. From this, it will be seen that as the motor rotates, shaft 1 will rotate the cam 2 and crank 3. As the crank 3 rotates, it will cause the vertical link 4 to reciprocate and thereby oscillate the bell crank lever 5 about the pin 6.

Hopper nut feeding mechanism—Figures 3 and 11

The hopper H includes a rectangular open top casing which extends upwardly from the rear end of the base B for a suitable distance. Nuts are introduced into the hopper H through its open top and are fed from the hopper through an opening 7 in its front face. To facilitate the movement of nuts to this opening, two inner side walls of the hopper are provided with bottom partitions 8 which slant downwardly toward vertical planes passing through opposite edges of the front face opening 7 and then pass vertically downward along such planes for a suitable distance. The bottom partitions 8 pivotally carry an inclined plate 9 which slants downwardly from a point adjacent the rear wall of the hopper to the lower edge of the front face opening 7. To prevent the jamming of nuts at the opening 7 and to limit the flow of nuts downwardly along the plate 9, the inner front wall of the hopper is provided with a bottom partition 10 which slants downwardly and rearwardly between the slanted portions of the side wall partitions.

The lower end of the inclined plate 9 normally extends below the lower edge of the front face opening 7. Consequently, the nuts which roll down the inclined plate are prevented, by the lower edge of that opening, from passing through it onto the inclined chute 11 and thus into the machine. In order to feed nuts through the hopper discharge opening, the lower end of the plate 9 is moved, at intervals, up to or slightly above the lower edge of this opening. To this end, the plate 9 is provided with an arm 12 which extends outwardly from the hopper to a position in which it overlies and rests upon one end of a lever 13. The lever 13 is pivotally mounted on the frame F with its other end in position to be engaged and pivotally moved by the cam 2, once during each revolution of the cam. Thus, during a limited portion of each revolution of the cam, the plate 9 is moved upwardly from its normal position and then returned thereto.

Since the pivoted edge of the inclined plate is in contact with the nuts around the hopper opening, which is formed by the rear vertical wall of the hopper and its slanted partitions 8 and 10, the movement of this plate serves to vibrate the nuts sufficiently to prevent their becoming jammed in the hopper. Furthermore, the slanted partition 10 prevents more than one layer of nuts of the larger sizes from being deposited upon the inclined plate 9. Consequently, under normal operating conditions, a continuous mass of nuts will extend from the hopper downwardly along the plate to the lower edge of the discharge opening, this mass being one layer deep when the larger sizes of pecan nuts, for example, are being cracked.

*Nut conveying mechanism—Figures 3, 4, and 5*

The nuts which roll down the chute 11 pass into the ends of nut-receiving recesses formed by a conveyor 14 and a stationary center piece 15. The conveyor 14 is constructed in the form of a ring having open-faced nut-receiving grooves or serrations 16 on its inner face. The central surfaces of each serration is slanted outwardly from the face of the ring at an angle of approximately 67½ degrees. The face of the ring is also arranged at an angle to the vertical of approximately 22½ degrees. As a result, the top recesses extend downwardly at an angle of approximately 45 degrees, this latter angle facilitating the feed of nuts into the bottom recesses. This ring is arranged over a rim 17 formed by the raised central portion of the center piece 15, the lower section of this rim 17 preventing the entry of nuts into the downwardly slanted nut receiving grooves at the bottom of the ring except through the upper open end of the grooves. This not only prevents the piling of nuts over the grooves of the ring, but also prevents the entry of more than one nut of ordinary size into any one groove. The rear marginal edge 18 of the center piece rim is flanged outwardly along rear radial face of the ring 14 except for a cutaway portion 19, the outwardly extending flange 18 carrying detachable wheel-retaining lugs 20 which overlie the outer face of the ring 14. The outwardly extending flange 18 of the center piece 15 also carries a brake member 21 which is resiliently held in engagement with the outer face of the conveyor ring to hold it stationary except when it is being driven.

Figure 6:
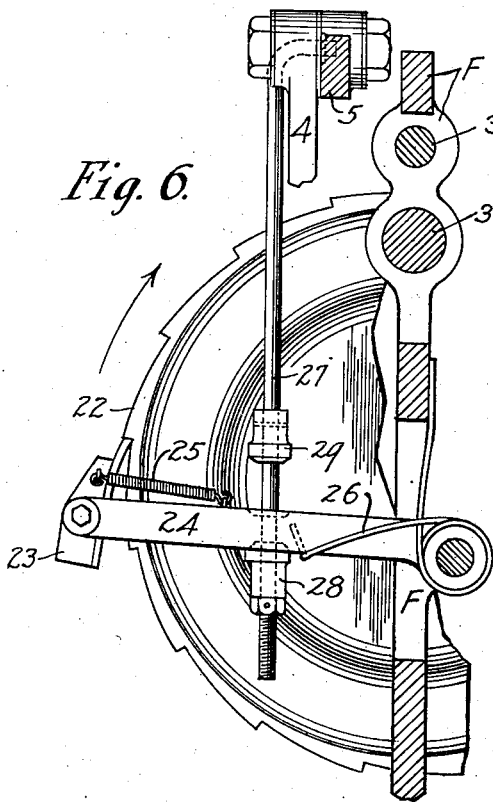
Figure 6 is a detail view of the conveyor driving mechanism, this view being taken along line corresponding to line 6—6 of Figure 3.
Figure 8:
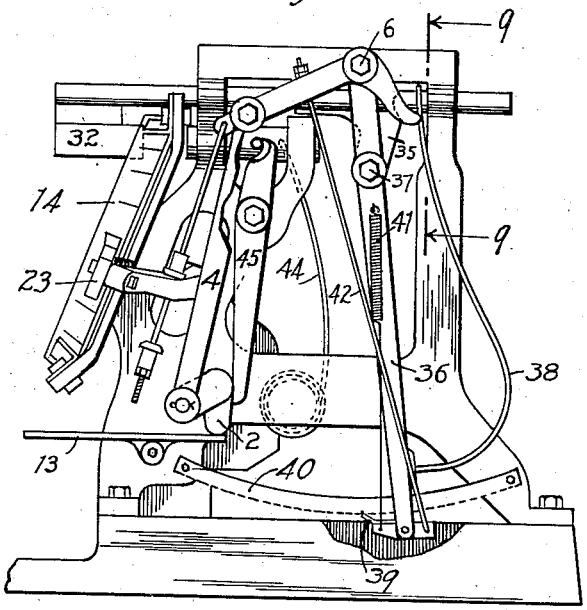
Figure 8 is a partly broken side elevation showing the parts in a position corresponding to D—9 position of Figure 12.

*Conveyor drive—Figures 3, 6, and 8*

The outer face of the ring 14 is provided with a ratchet 22 and the ring is driven by means of this ratchet and a pawl 23. The pawl is pivotally mounted on one end of an arm 24, the other end of which is pivotally secured to the frame F. This pawl is resiliently held against the ring ratchet by a spring 25, the opposite ends of which are respectively secured to the pawl 23 and arm 24. The arm is urged upwardly by a spring 26 but the tension of this spring is insufficient to drive the ring, the spring serving only to prevent the arm from moving downwardly beyond the limits in which it is positively moved.

To drive the arm, a rod 27 is provided. This rod passes upwardly through an opening in the arm 24 and has its upper end pivotally secured to the upper end of lever 5 so as to reciprocate vertically as the lever oscillates. The rod carries, on opposite sides of arm 24, adjustable nuts 28 and 29. During the upward movement of the rod, the lower nut 28 raises the arm and, during the downward movement of the arm, the upper nut 29 lowers the arm. These nuts are suitably spaced to provide proper time intervals between driving periods.

When the hopper of the machine is first filled with nuts and the machine set in operation, nuts will be fed through the discharge opening at a rate greater than the rate at which they are taken up by the conveyor. The excess nuts will, therefore, accumulate on the conveyor 11. Since the plate 9 is arranged to move only up to or slightly above the lower edge of the hopper discharge opening, the excess nuts on the chute 11 will not build up against the conveyor but instead, will form a layer on the chute similar to that formed on the inclined plate. When this layer extends over the conveyor continuously along the chute up to the discharge opening 9, the discharge of nuts through that opening will be prevented so that the nuts on the inclined plate 9 will simply move up and down with the plate without being discharged. It will be noted that a nut entering a recess at the bottom of the ring will, at first, rest entirely upon and be carried by the ring. As the nut approaches and passes the horizontal central plane of the ring, it is gradually shifted into contact with the rim 17 of the center piece and then rolled along the rim to the top of the ring. This rolling action tends to maintain the nuts substantially in the proper longitudinal position required for cracking purposes while the canopy formed over each nut by a ring serration 16 also functions to limit their movements from such position. Thus, both features facilitate the delivery of a nut, in proper cracking position, upon the nut holder 30 which projects, at the end of the center piece rim 17, into the space made available by the cut-away portion of the rim 17.

Figure 7:
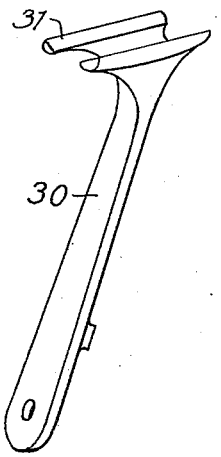
Figure 7 is a perspective view of the nut holder.
Figure 9:
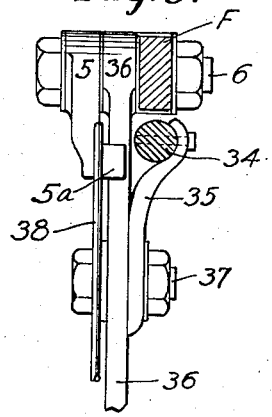
Figure 9 is a fragmentary section along line 9—9 of Figure 8.

Nut holder—Figures 4 and 7

The holder 30 is suitably secured at one end to the center piece 15 and is provided at its other end with a pair of spaced prongs 31. The prongs 31 extend slightly above the surface of the rim 17 so that the side of a nut rolled along the rim 17 will ultimately strike the first prong 31. In doing so, the nut is turned to or maintained in the correct longitudinal position and while in that position, is transferred to the nut holder by being rolled upwardly over the prong onto the nut supporting platform formed by both prongs 31, where it remains during the nut clamping and nut cracking operations. In this connection, it may be noted that a nut supported in a serration at the lower part of the wheel is free to rock, whereas a nut supported on the prongs 31 is held stationary. Consequently, a nut delivered properly to the prongs will be held in proper cracking position inasmuch as it cannot then rock into an improper position. This avoids an objection of arcuate holders which permit rocking with the result that the proper nut cracking position is achieved by accident rather than by design. Such arrangements sometimes produce proper cracking in as high as 75% of the nuts handled, whereas, with the arrangement proposed herein, proper cracking has been produced in as much as 95% of the nuts handled.

Nut clamping means—Figures 3, 8, 9, and 10

The prongs 31 of the holder are positioned between the nut clamping member 32 and the nut cracking member 33. The clamping member operates to clamp and hold the nut against the cracking member 33 which later operates to crack the nut. Since the length of the nuts vary, the relative movement of these members must likewise vary for otherwise a movement sufficient to crack a short nut would crush a long one. In this embodiment, successive movements of the cracking member 33 are made the same while those of the clamping member 32 are automatically adjusted to conform to the varying sizes of the different nuts.

The clamping member 32 is secured to one end of a reciprocable shaft 34 which extends longitudinally through the upper part of frame F. This shaft carries a bracket 35 through which it is connected to a pendulum bar 36, the latter being pivotally mounted on pin 6. The bracket 35 is fixedly secured at one end to the shaft 34 and, at its other end, pivotally secured to the pendulum bar 36 through the agency of a bracket pin 37 which passes through a slot on the pendulum 36. The pendulum is positively swung from right to left (clock-wise) by means of a laterally extended lug 5—a on the vertical arm of the oscillating bell crank lever 5 (Figure 9) and resiliently or yieldingly swung from left to right (counterclockwise) by means of a spring 38 which connects the vertical arm of bell crank lever 5 to the lower end of pendulum 36.

When the pendulum is positively swung from right to left, it moves shaft 34 and clamping member 33 rearwardly away from the clamping position. When the pendulum is yieldingly swung from left to right, it moves these members toward clamping position. During this clamping movement, if a nut is positioned on the holder 30, the clamping member 32 will continue to move until it presses the nut against the cracking member. From this point, the nut and cracking member cooperate to prevent further movement of the pendulum, but spring 38 permits continued movement of the vertical or driving arm of bell crank lever 5. Now, in order to hold the clamping member 32 rigidly in nut clamping position, suitable means are provided for locking the pendulum against movement out of clamping position.

Clamp locking means

To this end, the lower end of the pendulum is provided with a pawl 39 which is positioned for movement into and out of engagement with an arcuate ratchet 40, the latter being secured to the frame F. One end of the pawl is urged to pendulum-locking position by a spring 41 extending between and connected to the pawl and pendulum. The other end of the pawl is pivotally connected to one end of a rod 42, the other end of which projects loosely through the horizontal arm of the bell crank lever 5, the projecting end of the rod 42 carrying a nut 43. This nut is adjusted to a position along the rod 42 at which it operates to hold the pawl out of locking position as long as the pendulum and bell crank lever swing together as a unit. However, when the forward (left to right) movement of the pendulum is stopped, by virtue of the nut clamping operation, the horizontal arm of the bell crank lever 5, in continuing to swing counterclockwise, moves downwardly away from the nut 43 permitting the pawl or pendulum-locking spring 41 to pull the pawl 39 into locking engagement with the ratchet 40. With the pendulum locked, the clamping member 32 cannot move out of clamping positions; hence, the cracking member 33 may now be moved to crack the nut.

Figure 10:
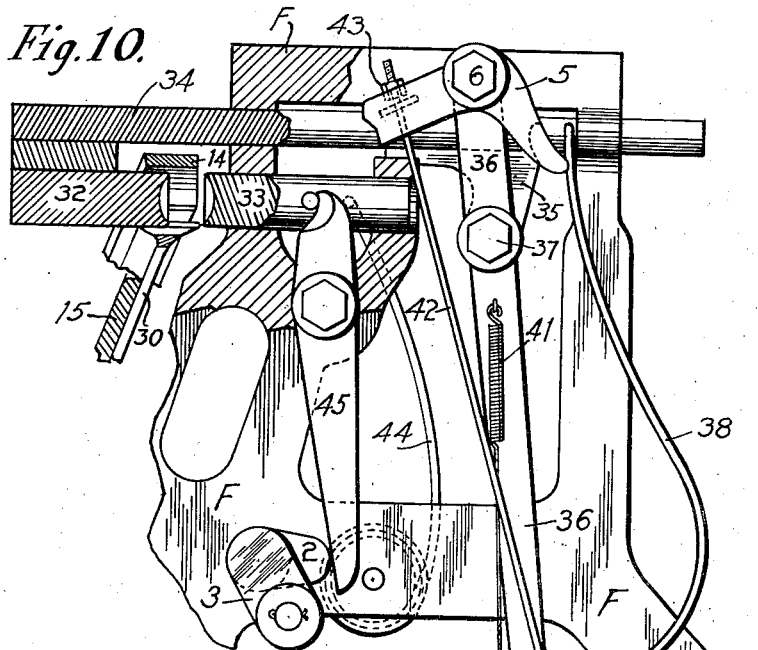
Figure 10 is a longitudinal vertical sectional view partly in elevation showing the parts in a position corresponding to the D—9 position of Figure 12.

Nut cracking mechanism—Figures 8 and 10

In order to crack a clamped nut, the cracking member 33, which is normally urged away from the cracking position by a spring 44, is connected, by a suitable pin, to one end of a cracking lever 45. The cracking lever 45 is pivotally mounted on the frame F with its other end positioned for engagement by the cam 2. During each revolution of the cam, it operates to swing the cracking lever 45 about its pivot, thereby causing the cracking member 33 to move rearwardly a measured or predetermined distance which is sufficient to crack the nut. The cracking member 33 and is then released by the cam 2 and moved to its normal position by spring 44. At the same time, the bell crank lever which is now moving clock-wise, operates both to unlock the pendulum bar 36 and to drive it clock-wise, thus moving the clamping bar 32 away from the nut and clamping position. The ring conveyor 14 is then moved to position another nut. As it does so, the cracked nut is brushed by the ring 14 from the holder into a hopper 46. (Figure 1.)

Figure 12:
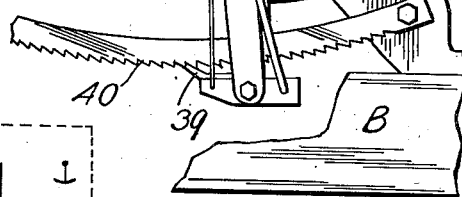
Figure 12 is a chart showing the various operations and the approximate relative positions of the cam 3 and pendulum bar 36.

Chart Figure 12

While the operation of this machine may be understood from the foregoing description, a clear understanding will be facilitated by reference to the chart of Figure 12. This chart shows the various operations of the machine and the approximate relative positions of the cam 2 and pendulum bar 36. At the left side of the chart, quarterly positions of the cam 3 are indicated graphically at U, L, D and R, wherein the cam respectively points up, left, down and right. This range of movement is further divided into sixteen parts so that the intermediate positions of the cam can be more specifically designated. At the right side of the chart, the right, left and central positions of the pendulum bar 36 are indicated, the pendulum positions at the right being those assumed when a nut is not contained on the holder 30. Furthermore, the L—5 position is the one illustrated in Figures 1 and 3 while the D—9 position is that illustrated in Figures 8 and 10.

From this chart it will be evident that during the movement of cam 2 from U—1 to U—4 positions, the ring 16 is turned to remove a cracked nut and position an uncracked nut. The ring then remains stationary from the U—4 position through all subsequent positions up to U—1. At the U—3 position, the pendulum bar 36 reaches its extreme left position and remains there to the U—4 position. During the U—4——D—9 cam movement, this bar moves from the extreme left to the extreme right, when a nut is not contained on the holder 30. Should a nut be placed on the holder 30, the pendulum 36 will stop, before reaching D—9, at a point depending upon the length of such nut. This point will ordinarily fall within the shaded area shown on the chart but with long nuts may be in advance of that area. Also during the U—4——D—9 cam movement, the inclined nut feeding plate 11 is moved upwardly to cause one or two nuts to pass from the hopper through its nut discharge opening 7.

From this chart it will be evident that, without a nut on the holder, the pendulum bar 36 will remain stationary from the D—9 to the R—14 position. This is because the pendulum reaches its extreme right position at D—9 whereas the bell crank lever does not reach its extreme right position until the cam moves to D—11 and does not leave it until the cam reaches D—12. With a nut on the holder, the pendulum will stop in advance of D—9 and remain stationary up to R—14 during which time the nut is held in clamped position between clamping member 32 and cracking member 33 and during the D—11 and R—14 position thereof, the nut is cracked by the member 33. Also during this same general range of movement, the nut feeding inclined plate 11 is moved downwardly to prevent the further feed of nuts into the hopper.

From R—14 to U—1 the pendulum bar moves from the extreme right partly toward the extreme lift. During this movement, a cracked nut is released. At the end of this movement, the machine is again conditioned to move the conveyor ring 14, such movement occuring between U—1 and U—4. For the sake of clearness, it may be mentioned that the nut releasing movement of the clamping member 32 does not end at U—1 but continues to U—3 remaining there to U—4 where the nut clamping movement begins.

Having described my invention, I claim:

1. In a nut cracking machine, the combination with a conveyor having a series of nut receiving grooves, said conveyor being arranged for movement along a path having one section wherein the grooves face upward, and another section wherein they are inverted, of means for delivering nuts to the upwardly facing grooves, a nut retaining member extending along the open face of the inverted grooves and along which the nuts are successively rolled on their respective long axes by the face of the grooves whereby the nuts are maintained substantially in the proper longitudinal position required for cracking purposes, a stationary nut holder positioned at the end of its retaining member to receive nuts directly therefrom, means for moving the conveyor intermittently, cooperating nut cracking elements arranged at opposite ends of said nut holder for relative movement toward and away from each other respectively to crack and release a nut on said holder, and means for effecting relative nut cracking movement between said elements during intervals when said conveyor is stationary.

2. In a nut cracking machine the combination with a conveyor having a series of nut receiving grooves, said conveyor being arranged for movement in a plane at a slight angle to the vertical so that the grooves face upward during one section of their travel and downward during another, of means for delivering nuts to upwardly facing grooves, means presenting under the downwardly facing grooves a nut retaining surface along which the nuts are successively rolled on their respective long axes by the face of the grooves whereby the nuts are maintained substantially in the proper longitudinal position required for cracking purposes, a stationary nut holder positioned to receive nuts immediately as they roll from said surface, means for moving the conveyor intermittently, cooperating nut cracking elements arranged at opposite ends of said nut holder for relative movement toward and away from each other respectively to crack and release a nut on said holder, and means for effecting relative nut cracking movement between said elements during intervals when said conveyor is stationary.

3. In a nut cracking machine, the combination with a rotatable nut holding ring having one of its rim faces serrated, said ring being arranged at an angle to the vertical, of a stationary rim extending along the serrated face of the ring and cooperating with the serrations thereof to provide nut receiving recesses, means for rotatably retaining said ring in cooperative relation with said stationary rim, means for delivering nuts to recesses wherein the grooves face upwardly, said stationary rim being cut away adjacent one section of the ring wherein the grooves face downwardly, means for rotating the ring whereby nuts carried by the upwardly facing grooves are gradually shifted into rolling contact with said stationary rim, as they approach the cut-away portion thereof, and a nut holder projecting into the cutaway portion of said rim, said holder being positioned to receive nuts as they roll from said rim.

4. In a nut cracking machine, the combination with a stationary member having a circular rim, said member being supported at an angle to the vertical, of a ring rotatably supported over said rim, the inner face of said ring being serrated so as to cooperate with said rim to provide nut receiving recesses, means for delivering nuts to the bottom recesses, means for rotating the ring whereby nuts carried by the bottom recesses are gradually shifted as they pass toward the top of the ring into rolling contact with said stationary rim, said rim being cut away adjacent the top of said ring and a nut holder projecting into the cut-away portion of said rim, said holder being positioned to receive nuts as they roll from said rim.

5. In a nut cracking machine, the combination with a nut holder, of clamping and cracking members arranged on opposite sides of said holder for movement toward and away from opposite ends of a nut supported on said holder, a pivotally mounted pendulum bar connected to said clamping member, means for yieldingly driving said pendulum in one direction to move said clamping member toward said nut, means operable automatically to lock said pendulum against movement out of clamping position when the clamping member is moved sufficiently to clamp a nut against the cracking member and means for moving said cracking member to crack a clamped nut.

6. In a nut cracking machine, the combination with a nut holder, of clamping and cracking members arranged on opposite sides of said holder for movement toward and away from opposite ends of a nut contained on said holder, a ratchet, a pivotally mounted pendulum bar connected to said clamping member and arranged for swinging movement along said ratchet, a pawl on said pendulum adjacent said ratchet, means for yieldingly driving said pendulum in one direction to move said clamping member toward a nut contained on said holder and means operable automatically to move said pawl into engagement with said ratchet and thereby lock said pendulum when said clamping member has moved sufficiently to clamp a nut against said cracking member and means for moving said cracking member to crack a clamped nut.

HENRY F. RUGGLES.